(12) United States Patent
Fleming et al.

(10) Patent No.: US 8,903,369 B2
(45) Date of Patent: Dec. 2, 2014

(54) METHODS AND APPARATUS FOR INTERFERENCE MANAGEMENT

(75) Inventors: Phil Fleming, Glen Ellyn, IL (US); Shirish Nagaraj, Hoffman Estates, IL (US); Raghavendra M. Ramakrishna, Bangalore (IN); Michael Honig, Evanston, IL (US)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 13/404,452

(22) Filed: Feb. 24, 2012

(65) Prior Publication Data
US 2013/0225144 A1 Aug. 29, 2013

(51) Int. Cl.
*H04M 3/00* (2006.01)
*H04W 24/00* (2009.01)
*H04B 17/00* (2006.01)

(52) U.S. Cl.
USPC .......................... 455/418; 455/424; 455/67.11

(58) Field of Classification Search
USPC ................. 455/418, 419, 420, 423, 424, 425, 455/67.11
See application file for complete search history.

(56) References Cited

U.S. PATENT DOCUMENTS

| | | | | |
|---|---|---|---|---|
| 5,710,797 A * | 1/1998 | Segal et al. | | 375/346 |
| 7,068,743 B1 * | 6/2006 | Suzuki | | 375/345 |
| 2002/0151310 A1 * | 10/2002 | Chung et al. | | 455/452 |
| 2007/0040704 A1 * | 2/2007 | Smee et al. | | 340/981 |
| 2007/0248052 A1 | 10/2007 | Nagaraj et al. | | |
| 2009/0047968 A1 * | 2/2009 | Gunnarsson et al. | | 455/446 |
| 2010/0080323 A1 * | 4/2010 | Mueck et al. | | 375/296 |
| 2010/0112999 A1 * | 5/2010 | Eskicioglu et al. | | 455/422.1 |
| 2010/0190498 A1 * | 7/2010 | Ha et al. | | 455/435.1 |
| 2010/0203887 A1 * | 8/2010 | Kim | | 455/434 |
| 2010/0227566 A1 * | 9/2010 | Kim et al. | | 455/67.13 |
| 2011/0124289 A1 | 5/2011 | Balachandran et al. | | |
| 2011/0134812 A1 * | 6/2011 | Senarath et al. | | 370/280 |
| 2011/0141933 A1 * | 6/2011 | Kim et al. | | 370/252 |
| 2011/0182236 A1 * | 7/2011 | Matsumoto et al. | | 370/328 |
| 2011/0211536 A1 * | 9/2011 | Khattak | | 370/328 |
| 2011/0212740 A1 * | 9/2011 | Senarath et al. | | 455/501 |
| 2011/0244900 A1 * | 10/2011 | Noh et al. | | 455/501 |
| 2012/0033624 A1 * | 2/2012 | Luo et al. | | 370/329 |
| 2012/0178462 A1 * | 7/2012 | Kim | | 455/450 |
| 2012/0182919 A1 * | 7/2012 | Jen | | 370/312 |
| 2012/0184218 A1 * | 7/2012 | Boudreau et al. | | 455/63.1 |
| 2012/0195284 A1 * | 8/2012 | Mann et al. | | 370/329 |
| 2012/0294395 A1 * | 11/2012 | Jones et al. | | 375/341 |
| 2012/0314742 A1 * | 12/2012 | Falahati et al. | | 375/219 |
| 2013/0156139 A1 * | 6/2013 | Lee et al. | | 375/341 |

* cited by examiner

*Primary Examiner* — Christopher M Brandt
(74) *Attorney, Agent, or Firm* — Harrington & Smith

(57) ABSTRACT

Systems and techniques for managing interference between pico cells in a pico cluster. Pico eNodeBs are configured in groups for each of a plurality of UEs, based on factors such as signal to noise ratio and geographic location. All signals from UEs may be measured by all eNodeBs in the cluster, but a pico group decodes packets only of UEs associated with the pico group. Decoded packets are exchanged between pico groups, and when a pico group is unable to decode packets of an associated UE, is uses the decoded packets received in exchanges to reconstruct an interference signal. The interference signal is subtracted from the received signal and the resulting received signal is used to decode the packets of the UE.

20 Claims, 14 Drawing Sheets

METHODS AND APPARATUS FOR INTERFERENCE MANAGEMENT

FIELD OF THE INVENTION

The present invention relates generally to wireless communication. More particularly, the invention relates to systems and techniques for management of interference between pico cells in a wireless network.

BACKGROUND

One of the greatest problems facing wireless network operators is the need to serve large numbers of users using the infrastructure available to them. More and more users are using devices with greater and greater capacities for data transfer, and using the devices more and more frequently. Many users use their devices nearly incessantly and any gathering of people can be expected to include many users who are transferring large amounts of data. For example, any sporting event, such as a football game, attended by a large gathering, can be expected to include a large number of persons who are using their devices to watch the game, watch other entertainment, photograph themselves and send the photos to their friends, look up statistics about the game, post updates about their emotional state when one team or the other scores, and electronically send and receive other information, only briefly raising their eyes to view the game itself. The persons attending a sporting event are usually seated close together, and if a large proportion of the attendees are using wireless communication devices, the demand presented by the devices is enormous. Service providers can and do deploy large numbers of small base stations at locations such as sport stadiums in order to meet the demand. A small base station will serve an area that may be defined as a pico cell, and concentrations of pico cells may be defined as pico cell clusters and may operate according to known governing the operation of, and interaction between, pico cells that are in pico cell clusters. Pico cell clusters are subject to significant inter-cell interference because of their close spacing and the close spacing of users.

SUMMARY OF THE INVENTION

This section contains examples of possible implementations and is not meant to be limiting.

In one embodiment of the invention, an apparatus comprises memory, at least one processor, and a program of instructions. The program of instructions is configured to, with the memory and the at least one processor, perform actions comprising at least analyzing a transmission from a user device associated with the apparatus to decode packets transmitted by the device and performing operations to cause delivery of decoded packets to at least one other apparatus having at least one other associated user device.

In another embodiment of the invention, an apparatus comprises memory, at least one processor, and a program of instructions. The program of instructions is configured to, with the memory and at least one processor, configure the apparatus to perform actions comprising at least configuring at least one base station to form a group of base stations associated with the apparatus and transmitting signals for decoding by base stations belonging to the group.

In another embodiment of the invention, a method comprises configuring at least one processor to cause an apparatus to perform actions comprising at least analyzing a transmission from a user device associated with the apparatus to decode packets transmitted by the device and performing operations to cause delivery of decoded packets to at least one other apparatus having at least one other associated user device.

In another embodiment of the invention, a computer readable medium stores a program of instructions. Execution of the program of instructions by a processor configures an apparatus to perform actions comprising at least analyzing a transmission from a user device associated with the apparatus to decode packets transmitted by the device and performing operations to cause delivery of decoded packets to at least one other apparatus having at least one other associated user device.

DETAILED DESCRIPTION

Various embodiments of the present invention recognize that clusters of pico cells are subject to pathloss conditions such that inter-pico interference is a dominant effect and this interference seriously limits capacity. Embodiments of the present invention therefore provide for cooperation among pico cells. A concentration of pico cells that are relatively close to one another and separated from other pico cells or groups of pico cells may be referred to as a pico cluster. Pico cells within a pico cluster may be assigned a cell ID such that they share a base sequence. Pico cells sharing a base ID, such as pico cells whose serving eNodeBs (eNBs) report to a single baseband unit, may be assigned to a single group. User devices, suitably referred to as user equipments (UEs) may communicate with eNodeBs serving different pico cells, and UEs may be assigned to groups according to various criteria, some of which are detailed below.

In a pico cluster, each pico group measures channels for all users within the cluster, and each pico group decodes transmissions from the UEs assigned to the group. Decoded packets are sent to the other pico groups. If a pico group receives transmissions from one of its UEs and is unable to decode the transmissions, an interference signal is reconstructed from decoded packet information received from other pico groups. The interference signal is subtracted from the received signal, so that the resulting signal can be decoded to recover the transmitted packets.

Figure 1A:
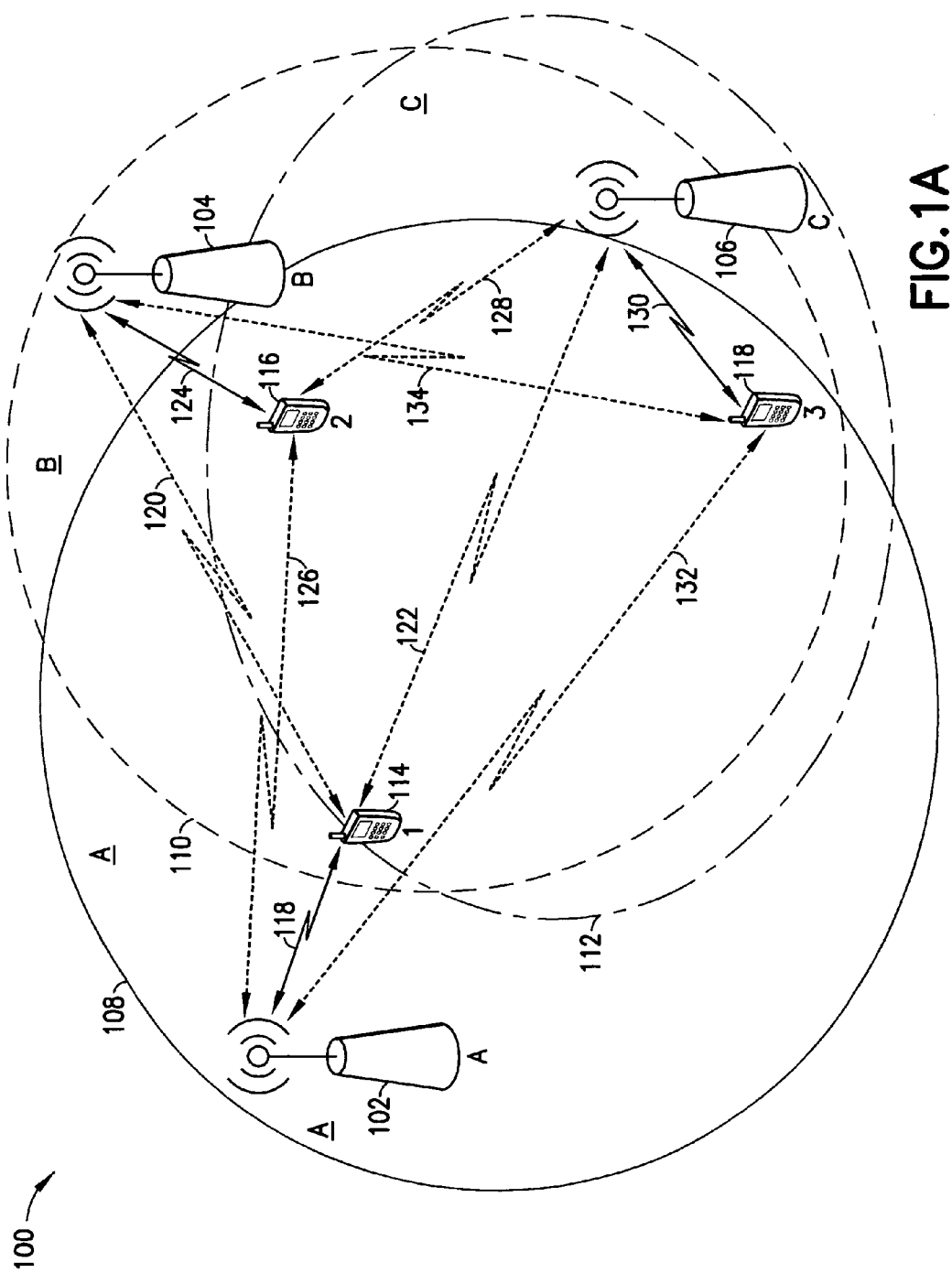
FIGS. 1A-1C illustrate various aspects of a cluster of pico cells operating according to one or more embodiments of the present invention.

FIG. 1A illustrates a pico cluster 100 comprising eNodeBs 102, 104, and 106, defining cells 108, 110, and 112, which may be also designated as cells A, B, and C, The eNodeBs 102, 104, and 106, serve UEs 114, 116, and 118. The UEs 114, 116, and 118 may be in a connected state with respect to each of the UEs 102, 104, and 106. Such an arrangement is frequently encountered in pico clusters because of the close spacing of pico eNodeBs in pico clusters. A UE may be within range of many pico eNodeBs, and each eNodeB may at least measure the channels using each eNodeB with which it is within range. In pico clusters in particular, it may be that each pico eNodeB within the cluster will be within range of each UE operating within the cluster. In the present example, the UE 114 has a serving connection 118 with the eNodeB 102 and interfering connections 120 and 122 with the eNodeBs 104 and 106, respectively. The UE 116 has a serving connection 124 with the eNodeB 104 and interfering connections 126 and 128 with the eNodeBs 102 and 106, respectively. The UE 118 has a serving connection 130 with the eNodeB 106 and interfering connections 132 and 134 with the eNodeBs 102 and 104, respectively.

In the present example, a simplified pico cluster of only three eNodeBs serving three UEs is illustrated here, but it will be recognized that embodiments of the present invention may be employed in pico clusters comprising any number of pico cells serving any number of UEs.

Embodiments of the present invention associate a group of pico cells, or pico group, with each UE. Each group may be seen by an associated UE as a virtual cell, with the members of the group acting in coordination to communicate with the UE. A pico group, or the virtual cell representing a pico group, may be organized and assigned to a UE based on criteria such as the long term signal to noise ratio of signals between the members of the group and the UE.

Different or additional criteria can be used to organize a group. For example, an optimal grouping based on signal to noise ratio might be to assign the UE 116 to a group comprising cells A and B, but instead the cells B and C might be chosen. The reason for such a choice might be, for example, to reduce the number of packet exchanges between groups. Reducing the number of packet exchanges that are needed simplifies and improves the efficiency of the interference reduction achieved by embodiments of the present invention by, for example, reducing latency between the time a signal is transmitted and the time it is finally decoded at a receiving eNodeB.

Figure 1B:
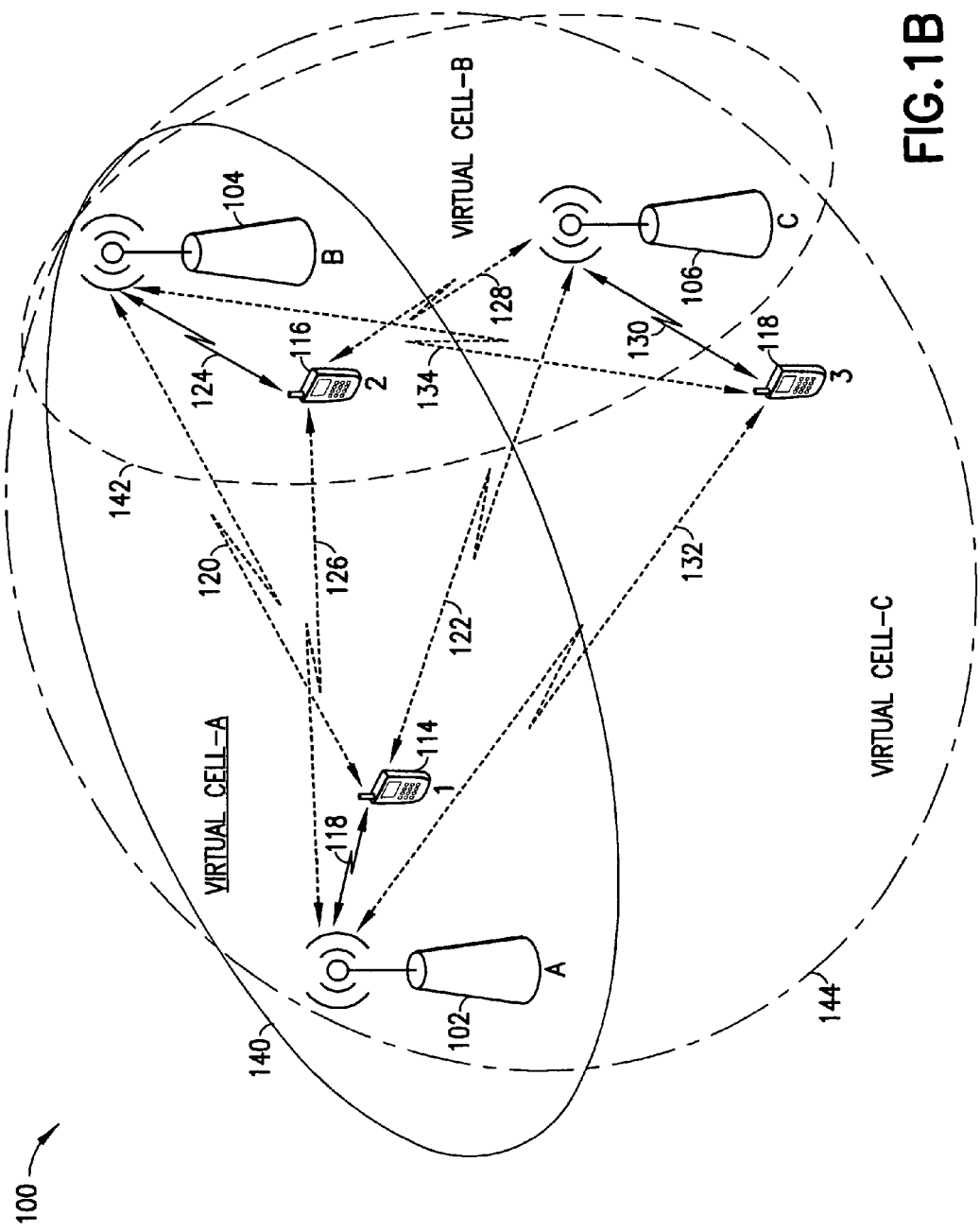

FIG. 1B illustrates an embodiment in which the UE 114 is assigned to pico group A, comprising cells A and B and served by eNodeBs 102 and 104. The UE 116 is assigned to pico group B, comprising cells B and C and served by eNodeBs 104 and 106. The UE 118 is assigned to pico group C, comprising cells A, B, and C and served by all of the eNodeBs 102, 104, and 106.

It can be seen that each of the UEs 114, 116, and 118 sends signals to and receives signals from each of the eNodeBs 102, 104, and 106. However, not each of the eNodeBs communicates with each of the UEs in the sense of actually sending information to and receiving information from each of the UEs. Thus, as noted above, the signals 118, 124, and 130 are serving signals and the signals 120, 122, 126, 128, 132, and 134 are interfering signals. Sending information to and receiving information from a UE may be defined as involving the decoding of packets from a UE. All of the eNodeBs may receive signals from a UE, and may measure transmissions from the UE, but only specified ones of the eNodeBs will decode or attempt to decode packets transmitted by the UE. In the present example, the pico group A decodes the signal 118, the pico group B decodes the signal 124, and the pico group C decodes the signal 130.

Decoding of packets, combined with the measuring of signals conducted by the different eNodeBs, provides useful information relating to interference signals. The virtual cells A, B, and C all exchange information relating to successfully decoded packets.

Figure 1C:
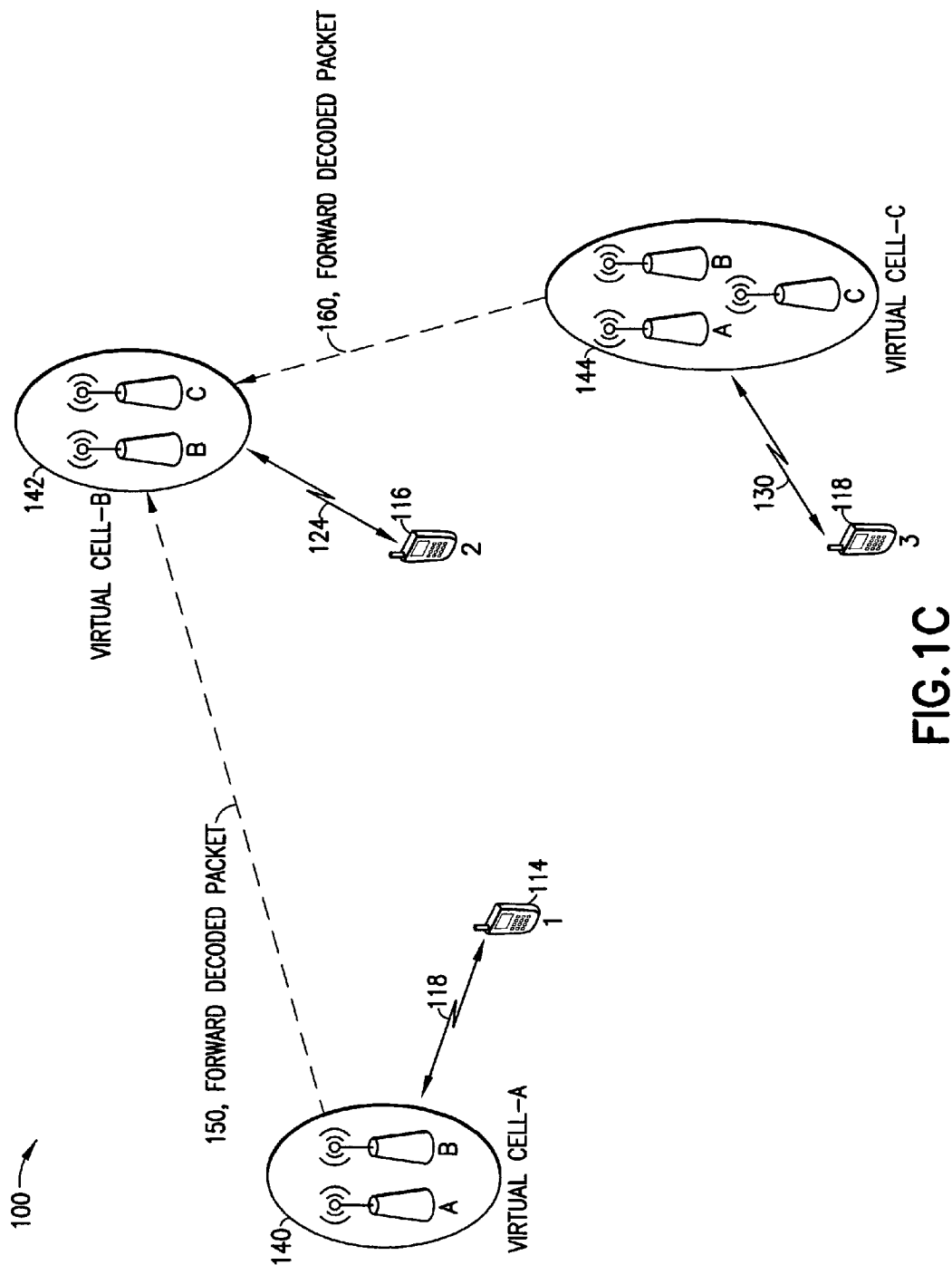

FIG. 1C illustrates an example of packet exchange to improve interference cancellation capabilities. In the pres-ently illustrated example, the virtual cell 140 has decoded the packets of the UE 114, transmitted by the signal 118, and the virtual cell 144 has decoded the packets of the UE 118, transmitted by the signal 130. The virtual cell 142 has failed to decode the packets of the UE 118, transmitted by the signal 124. According to one or more embodiments of the invention, therefore, successfully decoded packets are exchanged between pico groups. Therefore, packets from the UE 114 are delivered from the pico group A to the pico group B in a transmission 150 and packets from the UE 114 are delivered from the pico group C to the pico group B in a transmission 160. The pico group B is able to use the received packets to estimate the interference signal, and is then able to subtract the interference signal from the signal received from the UE 116. The ability of the pico group B to decode the resulting signal is greatly improved compared to its ability to decode the originally transmitted signal.

eNodeBs according to embodiments of the present invention employ interference canceling receivers, and employ decoded packets from other eNodeBs to improved their interference cancellation.

Before proceeding with a description of exemplary interference canceling receivers, it is helpful to provide a mathematical basis for the receivers. For simplicity, consider a two user case where the signal model for a subcarrier is the following:

$$y = h_1 x_1 + h_2 x_2 + n$$

$$y = \underbrace{[\,h_1\;\;h_2\,]}_{H} \underbrace{\begin{bmatrix} x_1 \\ x_2 \end{bmatrix}}_{x} + n$$

$$y = Hx + n$$

where y is a received vector, x is a matrix corresponding to the transmitted vectors from users 1 and 2 (and the subscripts 1 and 2 refer to the corresponding user), n is a noise vector, and H is a channel matrix. The general MMSE solution is takes the form of the following:

$$\hat{x} = \bar{x} + VH^H(HVH^H + R_{nn})^{-1}(y - H\bar{x}),$$

where $\bar{x}$, V represents the prior information, i.e., mean and variance of the symbol vector x:

$$V = \begin{bmatrix} v_1 & 0 \\ 0 & v_2 \end{bmatrix}, \bar{x} = \begin{bmatrix} \bar{x}_1 \\ \bar{x}_2 \end{bmatrix}$$

$$v_k = E[x_k x_k^*], \bar{x}_k = E[x_k].$$

Also, $\hat{x}$ is the value of x at the receiver, the superscript H indicates the matrix is Hermitian, $R_{nn}$ is the interference and noise covariance matrix, the superscript of the asterisk indicates complex conjugate, the superscript "−1" indicates matrix inversion, and E[•] indicates the expectation.

There are a number of different possible non-linear receiver structures. For an LMMSE solution, without any prior information, the following may be performed:

$$\bar{x} = 0, V = I_2$$

$$\hat{x} = H^H(HH^H + R_{nn})^{-1}y$$

$$\hat{x}_1 = e_1^T H^H (HH^H + R_{nn})^{-1} y \propto h_1^H (h_2 h_2^H + R_{nn})^{-1} y,$$

where $e_j$ is the jth unit vector and the superscript T indicates transpose.

For a hard-interference cancellation (Hard-IC) receiver, with the first iteration using an LMMSE receiver, and user-1 is not decoded (i.e., CRC fail) but user-2 is decoded (i.e., CRC pass), then the user-1 is re-estimated using the following:

$$\hat{x}_1 = e_1^T V H^H (HVH^H + R_{nn})^{-1}(y - H\bar{x})$$

$$\text{where, } V = \begin{bmatrix} 1 & 0 \\ 0 & 0 \end{bmatrix}, x = \begin{bmatrix} 0 \\ x_2 \end{bmatrix}$$

This simplifies to the following:

$$\hat{x}_1 = h_1^H(h_1 h_1^H + R_{nn})^{-1}(y - h_2 x_2) \propto h_1^H R_{nn}^{-1}(y - h_2 x_2)$$

Figure 2:
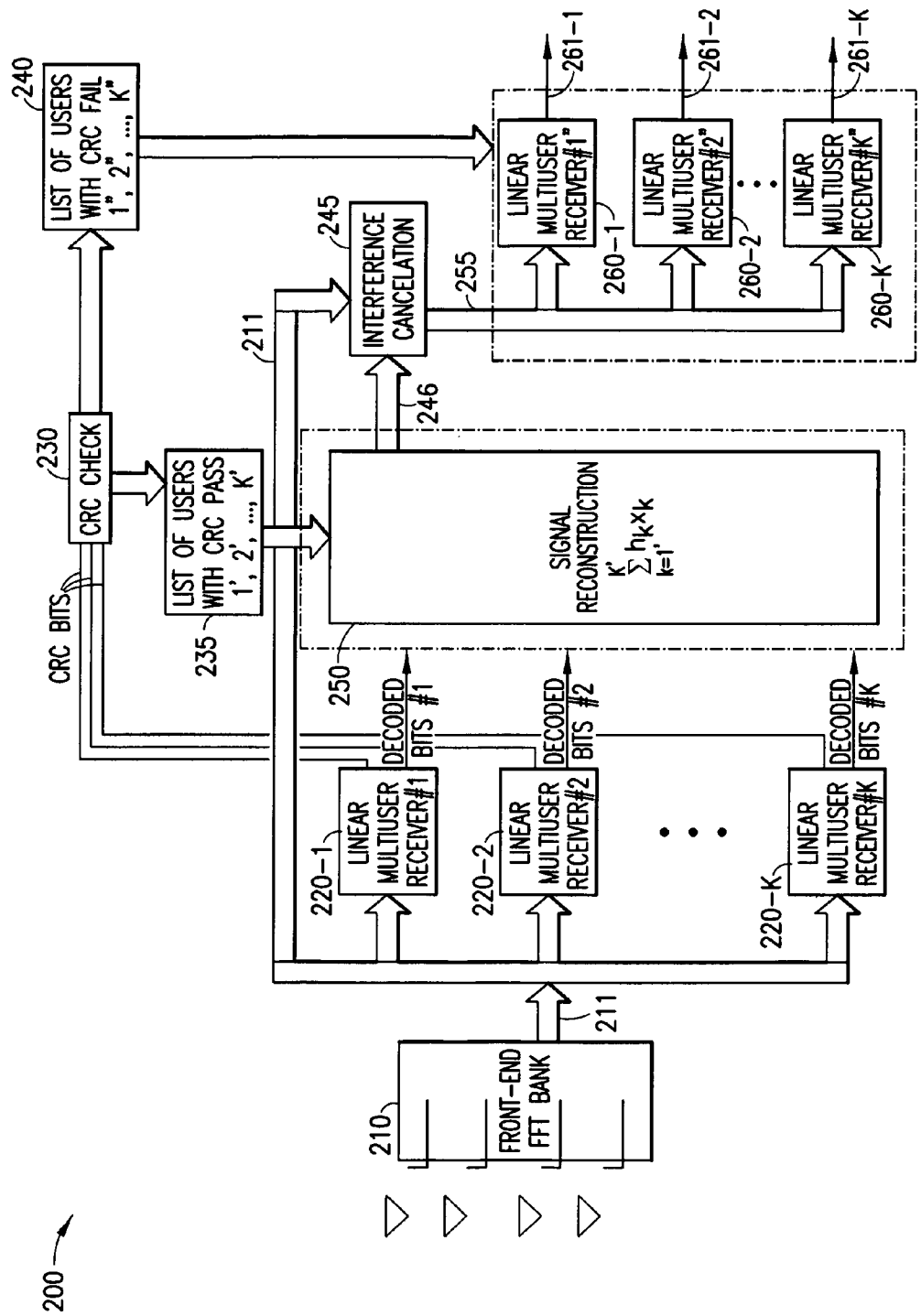
FIGS. 2-4 illustrate aspects of interference cancelling receivers according to embodiments of the present invention.

A block diagram is shown in FIG. 2 of a Hard-IC (e.g., non-linear) receiver 200 and operations performed thereby. The receiver 200 forms part of an eNodeB, for example, and can be implemented using, e.g., the one or more processors—for example, as digital signal processors (DSP) or other integrated circuits), using the computer program code executed by one or more processors or using operations "hardwired" into one or more processors, or some combination of these. In FIG. 2, an eNodeB, receives signals from a plurality of UEs. In this example, the receiver has four antennas 202A-202D, but this is merely exemplary and for ease of exposition. The receiver 200 includes a first stage and a second stage. The first stage can be considered to include, e.g., blocks 210 and 220. The second stage can be considered to include, e.g., blocks 230, 235, 240, 245, 250, and 260. The receiver 200 includes a front-end FFT bank 210, which outputs frequency domain signal 211 to the linear multiuser receivers 220-1 through 220-K and to the interference cancellation operation 245. Each of the linear multiuser receivers 220 produces a corresponding set of decoded bits and CRC bits.

The CRC bits are checked at the CRC check operation 230, which produces a list 235 of users with CRC pass and a list 240 of users with CRC fail.

The decoded bits are used by the signal reconstruction operation 250, which performs the signal reconstruction shown:

$$\sum_{k=1}^{K} h_k x_k.$$

The output of the signal reconstruction operation 250 is a reconstructed signal 246. The signal reconstruction operation 250 performs the following for each decoded user (i.e., each user with a CRC pass): constructs modulation symbols from the decoded bits; generates a frequency domain signal using the modulation symbols; and, performs signal reconstruction by multiplying the frequency domain signal with an estimated channel for that user.

The interference cancellation operation 245 uses the reconstructed signal 246 to cancel interference from the frequency domain signal 211 and create an interference-reduced signal 255. The linear multiuser receivers 260-1 through 260-K operate on the signal 255 and use the list 240 of users with CRC fail, and produce corresponding output bit streams 261 for each of the users. In typical operation, only those receivers 260 having a corresponding user in the list 240 (of users with CRC fail) will perform decode operations.

The interference cancellation discussed above employs packets decoded by a single device, such as an eNodeB. Embodiments of the present invention employ exchanges of decoded packets, so that eNodeB groups have the benefit of the additional information provided by packets decoded by other eNodeB groups.

Figure 3:
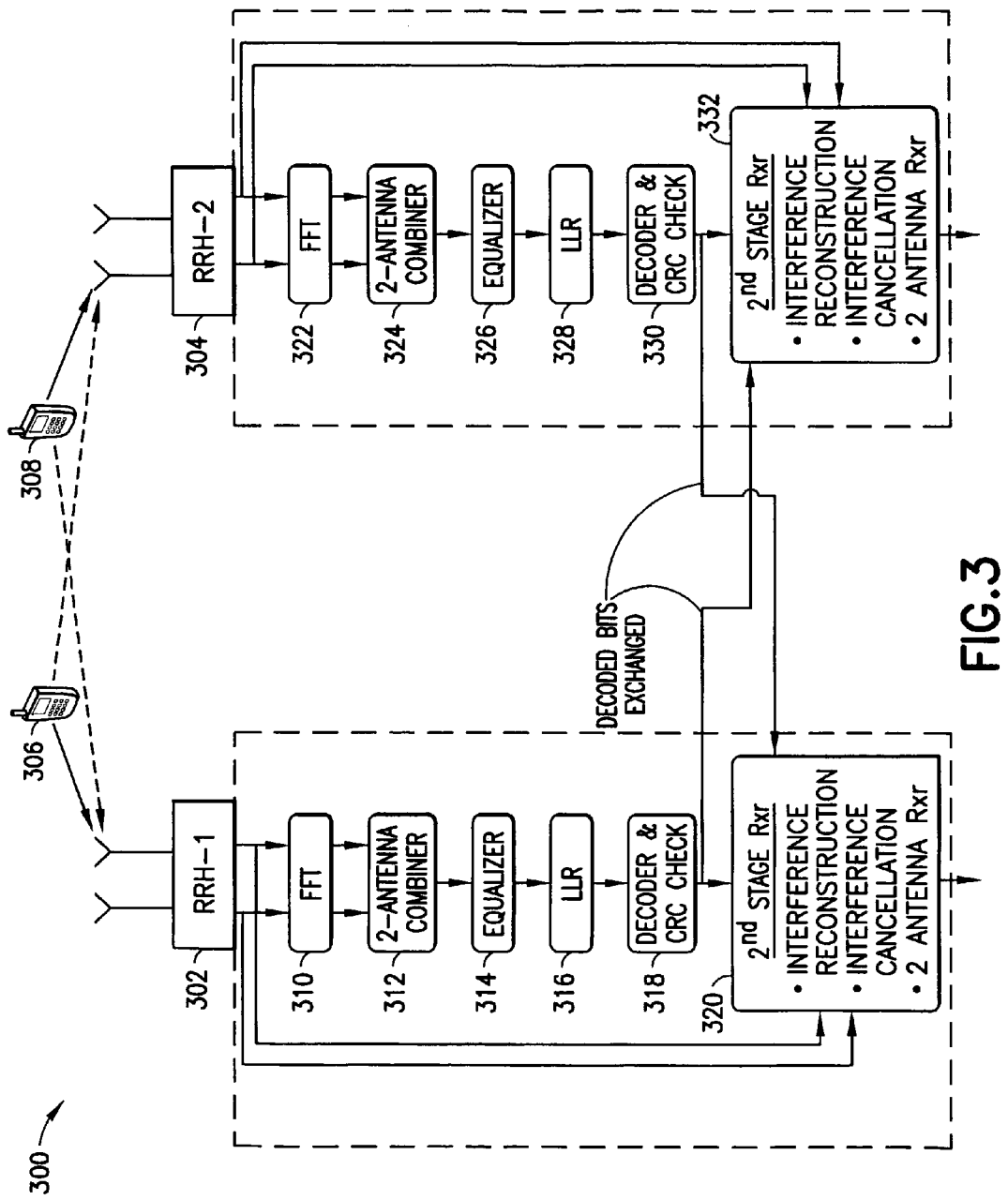

FIG. 3 illustrates a configuration 300 according to an embodiment of the present invention, showing remote radio heads 302 and 304, and UEs 306 and 308. The remote radio head 302 comprises a fast fourier transform component 310, a 2-antenna combiner 312, an equalizer 314, an LLR 316, and a decoder and CRC check component 318. The remote radio head 302 also comprises a second stage receiver 320, performing interference reconstruction and interference cancellation. The remote radio head 302 measures signals of both the UE 306 and the UE 308, but decodes packets from the UE 306. The remote radio head 304 comprises a fast fourier transform component 322, a 2-antenna combiner 324, an equalizer 326, an LLR 328, and a decoder and CRC check component 330. The remote radio head 304 also comprises a second stage receiver 332, performing interference reconstruction and interference cancellation. The remote radio head 304 measures signals of both the UE 306 and the UE 308, but decodes packets from the UE 308.

The remote radio heads 302 and 304 exchange decoded bits, with each of the remote radio heads passing bits to the other's second stage receiver after the bits have been decoded and the CRC check has been passed.

Figure 4:
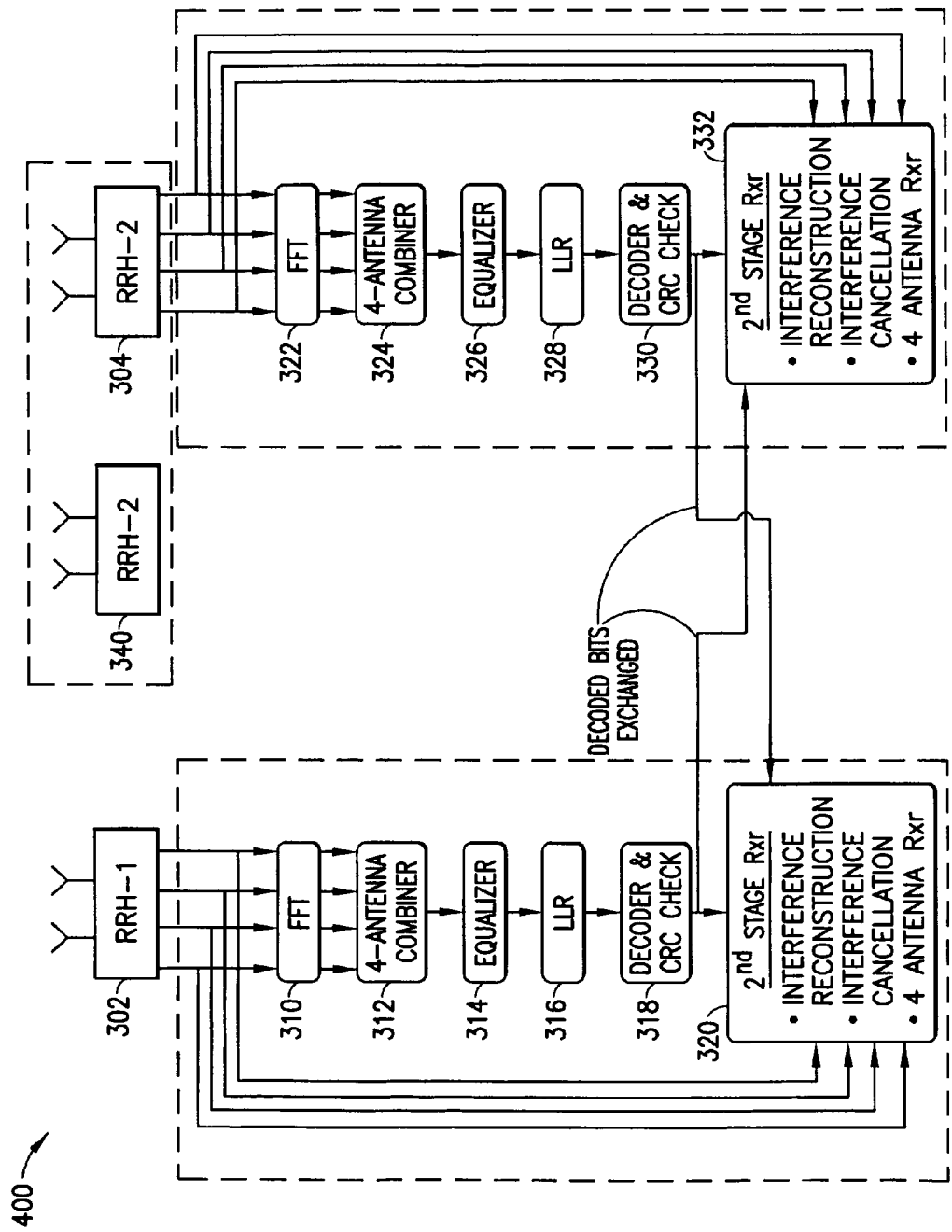

The configuration 300 illustrates a per-cell processing mode. FIG. 4 illustrates a configuration 400 of remote radio heads operating in a cluster mode. In the illustrated configuration, the remote radio heads 302 and 304 are configured similarly to the configuration 300 of FIG. 3, but are identified as belonging to eNodeB groups in which the remote radio head 340 is also included. The present example illustrates the remote radio head 340 as belonging to two different groups, but it will be recognized that any number of groupings may be configured, with exemplary groupings being configured for each UE.

Figure 5:
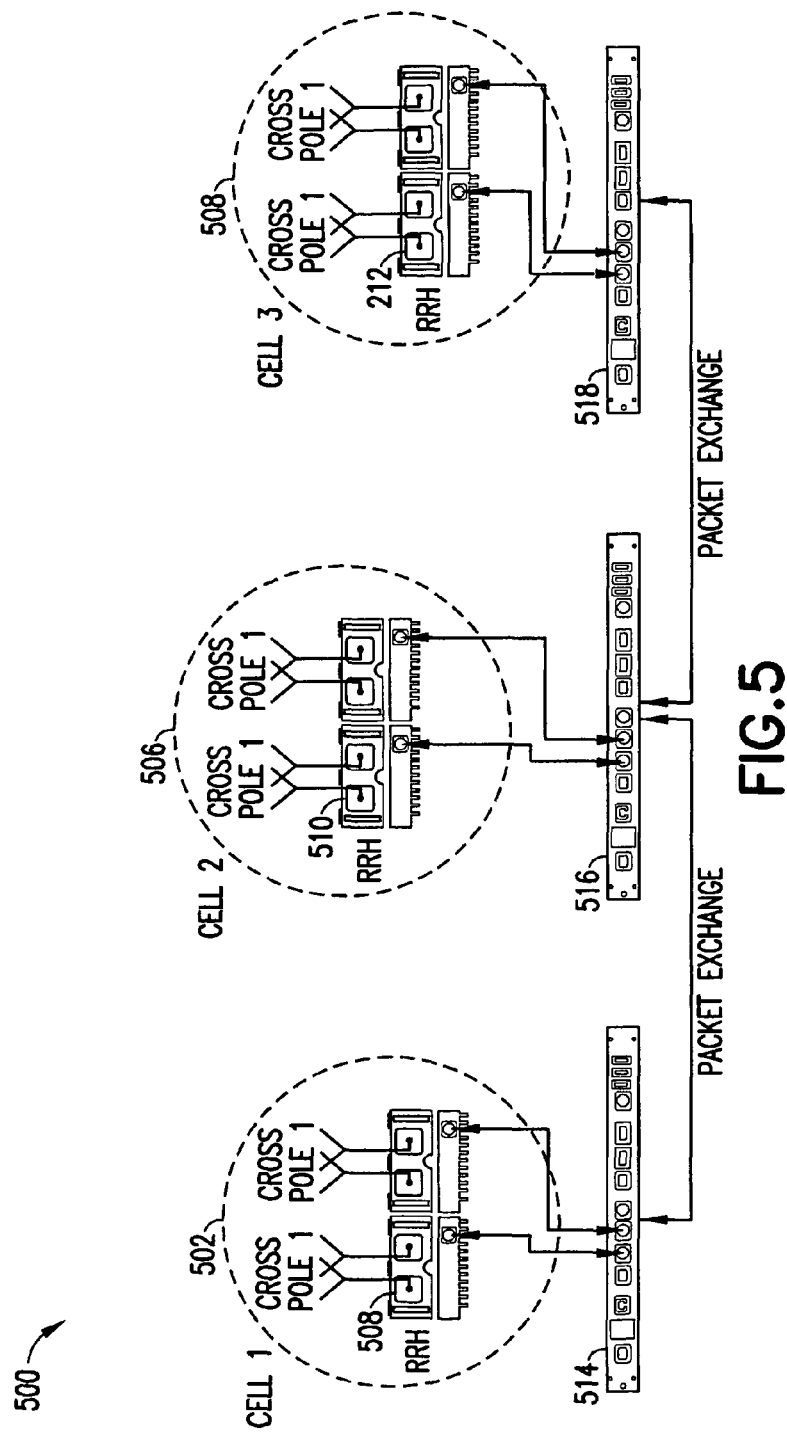
FIGS. 5-7 illustrate configurations of pico cells according to embodiments of the current invention.
Figure 6:
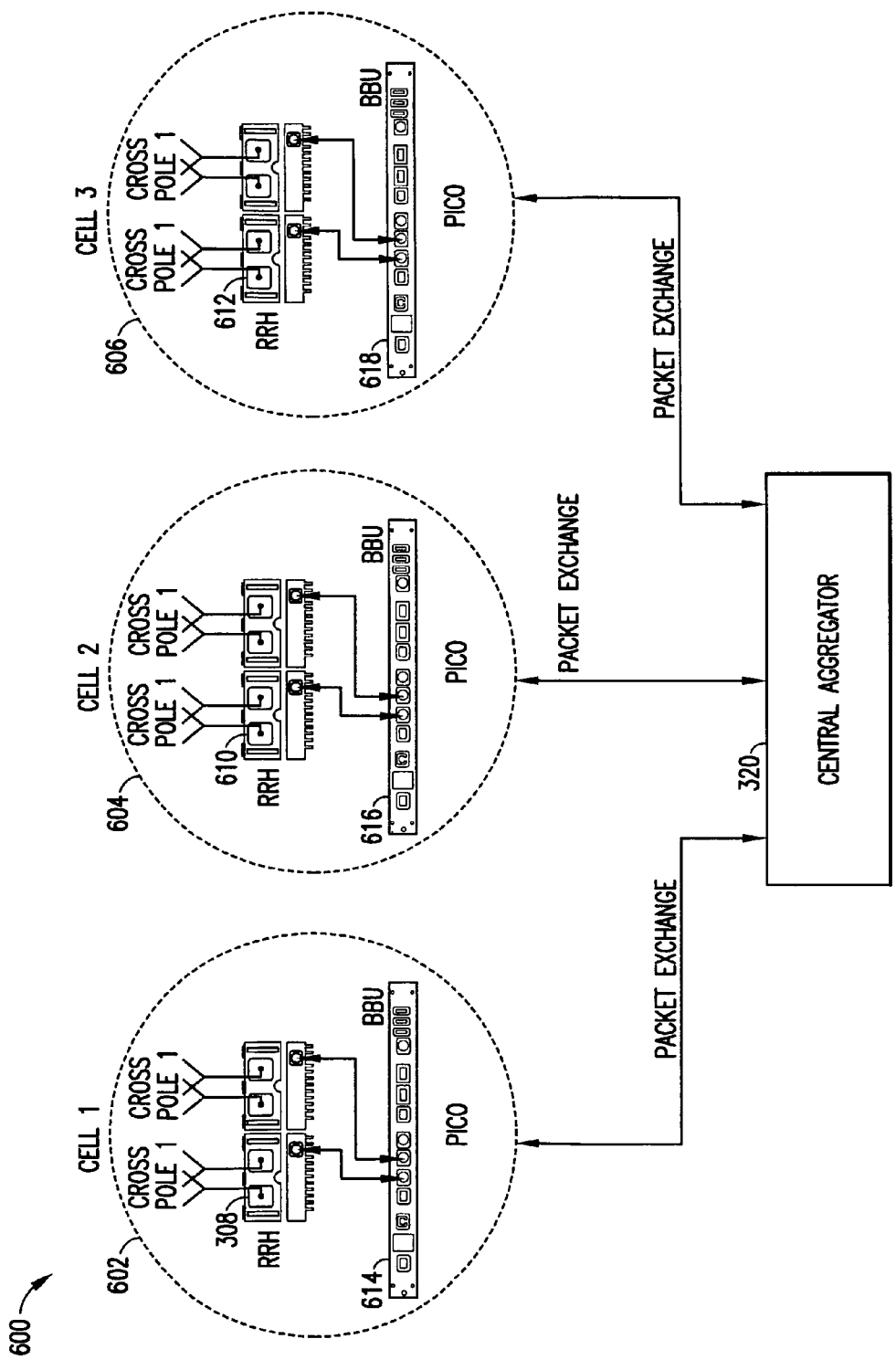
Figure 7:
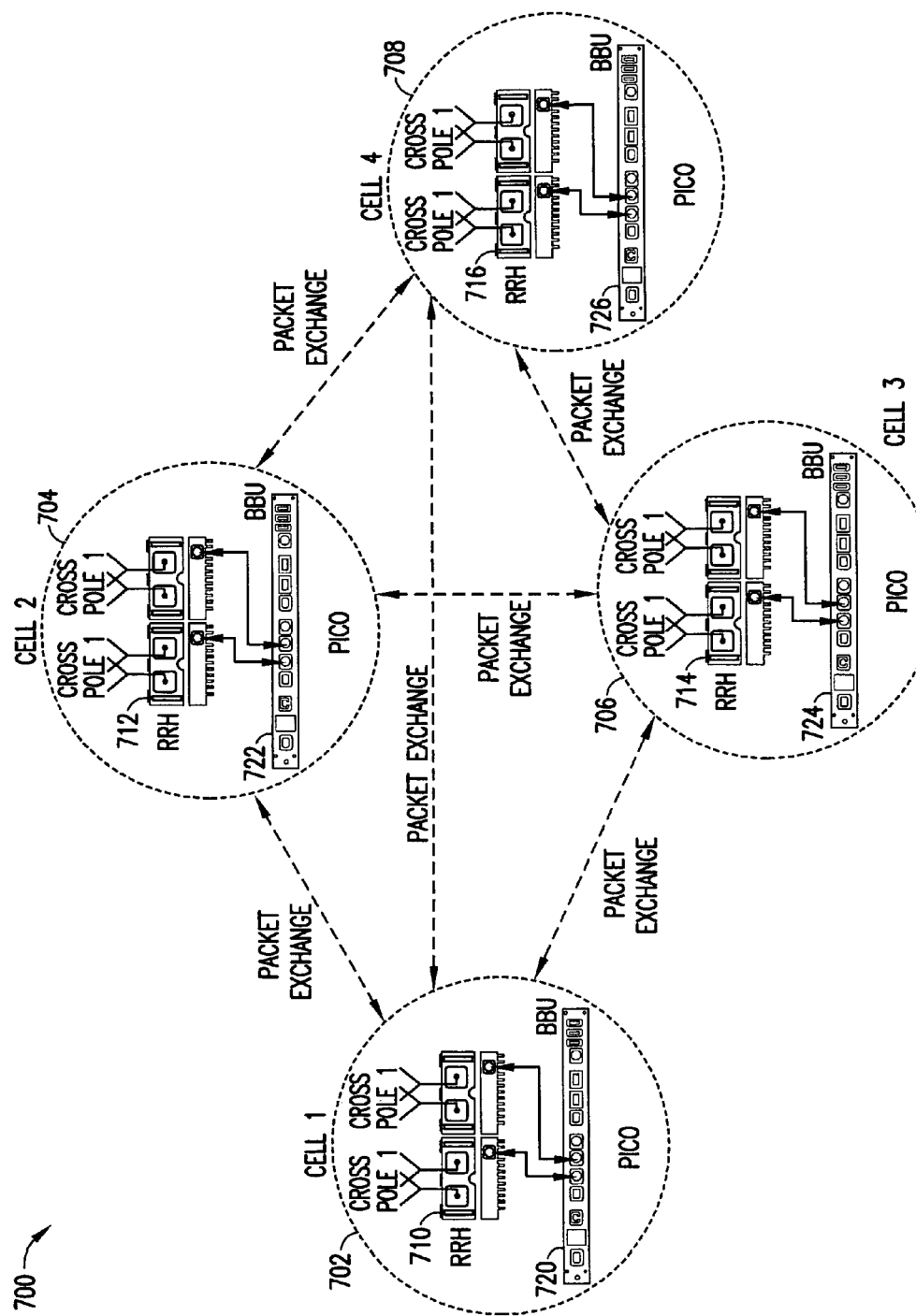

FIGS. 5-7 illustrate different configurations of pico groups and different mechanisms for packet exchange.

FIG. 5 illustrates a pooled baseband unit configuration 500 according to an embodiment of the present invention. First, second, and third pico cells 502, 504, and 506 are served by pico eNodeBs, in the form of remote radio heads 508, 510, and 512, respectively. The remote radio heads 508, 510, and 512 are connected to baseband units 514, 516, and 518, respectively. All packets are transferred between each of the baseband units 514, 516, and 518, so that each pico eNodeB has access to all of the decoded packets. Each UE is assigned a group of pico cells, and therefore pico eNodeBs, based on long term signal to noise ratio or geographical location, and a pico group that is unable to decode packets of an assigned UE has access to other decoded packets of other UEs that may be used to estimate interference.

FIG. 6 illustrates a configuration 600 according to an embodiment of the present invention. First, second, and third pico cells 602, 604, and 606 are served by pico eNodeBs, in the form of remote radio heads 608, 610, and 612, respectively. The remote radio heads 608, 610, and 612 are connected to baseband units 614, 616, and 618, respectively. The baseband units 614, 616, and 618 exchange packets with a central aggregator 620. Each pico eNodeB attempts to decode packets from the users assigned to it, and sends decoded packets to the central aggregator 620. The central aggregator 620 provides decoded packets to a pico eNodeB only if the packets have been received from a dominant interferer. The configuration of FIG. 6 is useful to provide a low bandwidth backhaul.

FIG. 7 illustrates a configuration 700 according to an embodiment of the present invention. First, second, third, and fourth pico cells 702, 704, 706, and 708 are served by pico eNodeBs, in the form of remote radio heads 710, 712, 714, and 716, respectively. The remote radio heads 710, 712, 714, and 716 are connected to baseband units 718, 720, 722, and 724, respectively. The baseband units 718, 720, 722, and 724 exchange packets with one another. Each link is a low bandwidth link, but the number of links quadratically increases with the number of cells.

Figure 8:
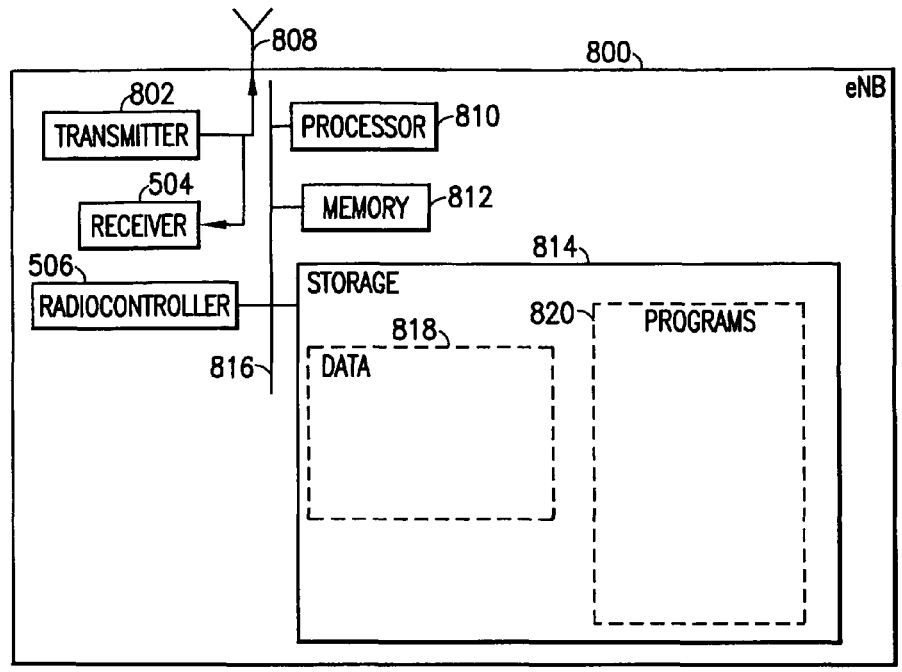
FIGS. 8-11 illustrate details of elements used in embodiments of the present invention.
Figure 9:
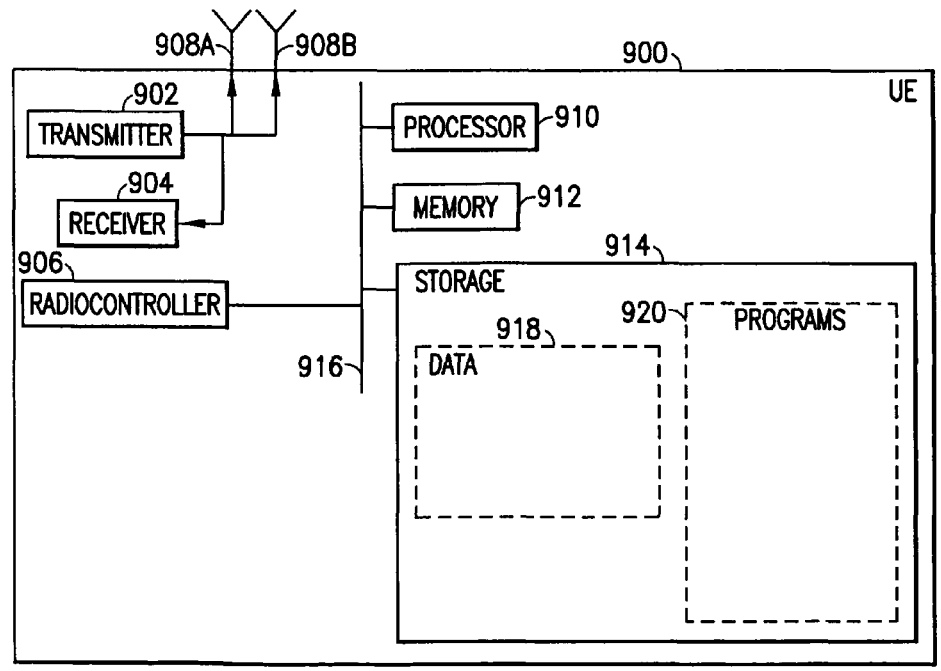

FIGS. 8 and 9 illustrate additional details of a UE and an eNodeB that may be configured according to, and employed in, embodiments of the present invention. FIG. 8 illustrates a UE 800, suitably comprising a transmitter 802, receiver 804, radiocontroller 806, and antenna 808. The UE 800 may also suitably comprise a processor 810, memory 812, and storage 814, suitably communicating with one another and with the radiocontroller 806 over a bus 816. The UE 800 may also suitably employ data 818 and programs 820, suitably residing in storage 814 and transferred to memory 812 as needed for use by the processor 810.

FIG. 9 illustrates an eNodeB 900, suitably comprising a transmitter 902, receiver 904, radiocontroller 906, and antenna 908. The eNodeB 900 may also suitably comprise a processor 910, memory 912, and storage 914, suitably communicating with one another and with the radiocontroller 906 over a bus 916. The eNodeB 900 may also suitably employ data 918 and programs 920, suitably residing in storage 914 and transferred to memory 912 as needed for use by the processor 910.

Figure 10:
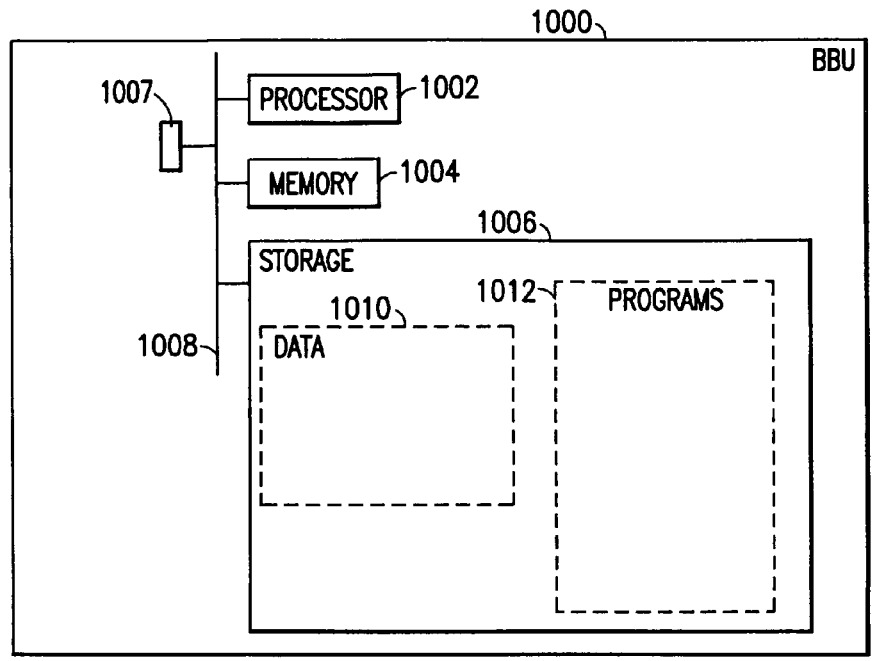
Figure 11:
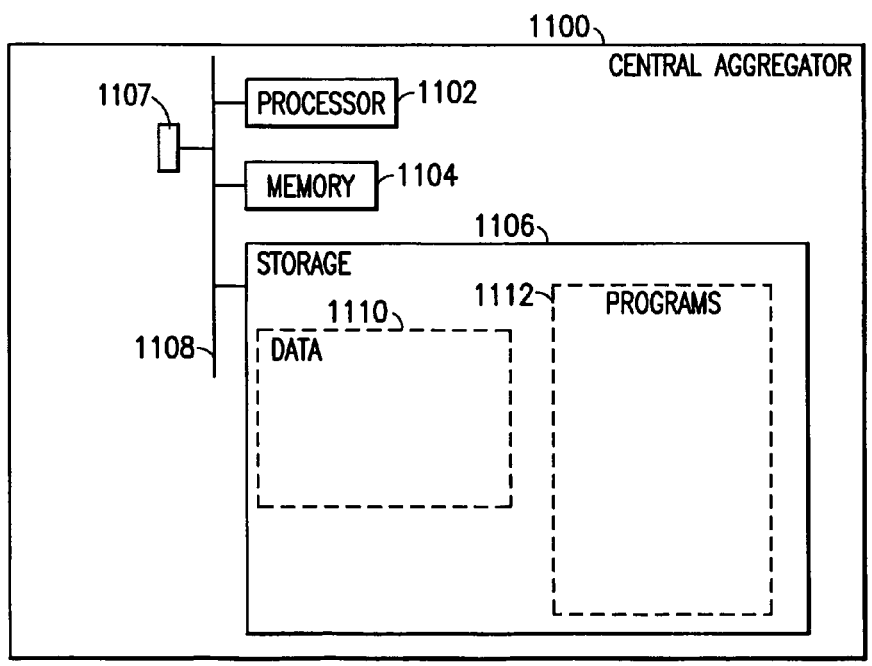

FIGS. 10 and 11 illustrate a baseband unit (BBU) 1000 and a central aggregator 1100. The baseband unit suitably comprises a processor 1002, memory 1004, storage 1006, and interface 1007, suitably communicating with one another over a bus 1008. The baseband unit 1000 may also suitably employ data 1010 and programs 1012, suitably residing in storage 1006 and transferred to memory 1004 as needed for use by the processor 1002.

The central aggregator 1100 suitably comprises a processor 1102, memory 1104, storage 1106, and interface 1107, suitably communicating with one another over a bus 1108. The central aggregator 1100 may also suitably employ data 1110 and programs 1112, suitably residing in storage 1106 and transferred to memory 1104 as needed for use by the processor 1102.

The eNodeB 800, UE 900, baseband unit 1000, and central aggregator 1102 comprise components similar to those that are or may be used in the various similar elements discussed above. The memories 812, 912, 1004, and 1104 and storage 814, 914, 1006, and 1008 may store computer program code configured to, with their associated processors 810, 910, 1002, and 1102, cause the elements to which they belong to perform one or more of the operations as described herein.

The memory 812, 912, 1004, and 1104, and storage 814, 914, 1006, and 1106, may be of any type suitable to the local technical environment and may be implemented using any suitable data storage technology, such as semiconductor based memory devices, flash memory, magnetic memory devices and systems, optical memory devices and systems, fixed memory and removable memory. The processors 810, 812, 1002, and 1102 may be of any type suitable to the local technical environment, and may include one or more of general purpose computers, special purpose computers, microprocessors, digital signal processors (DSPs) and processors based on a multi-core processor architecture, as non-limiting examples.

Embodiments of the present invention may be implemented in software (executed by one or more processors, hardware (for example, an application specific integrated circuit), or a combination of software and hardware. In an exemplary embodiment, software is maintained on any one of various conventional computer-readable media. In the context of this document, a "computer-readable medium" may be any medium or means that can store, communicate, propagate, or transport data or instructions for use by or in connection with an instruction execution or data processing system, apparatus, or device, such as a computer, with examples of computers being depicted in FIGS. 8-11 and described in connection therewith. A computer readable medium may comprise a computer-readable storage medium that may be any media or means that can contain or store instructions or data for use by or in connection with an instruction execution or data processing system, apparatus, or device, such as a computer.

In general, the various embodiments of the user equipment 900 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 12:
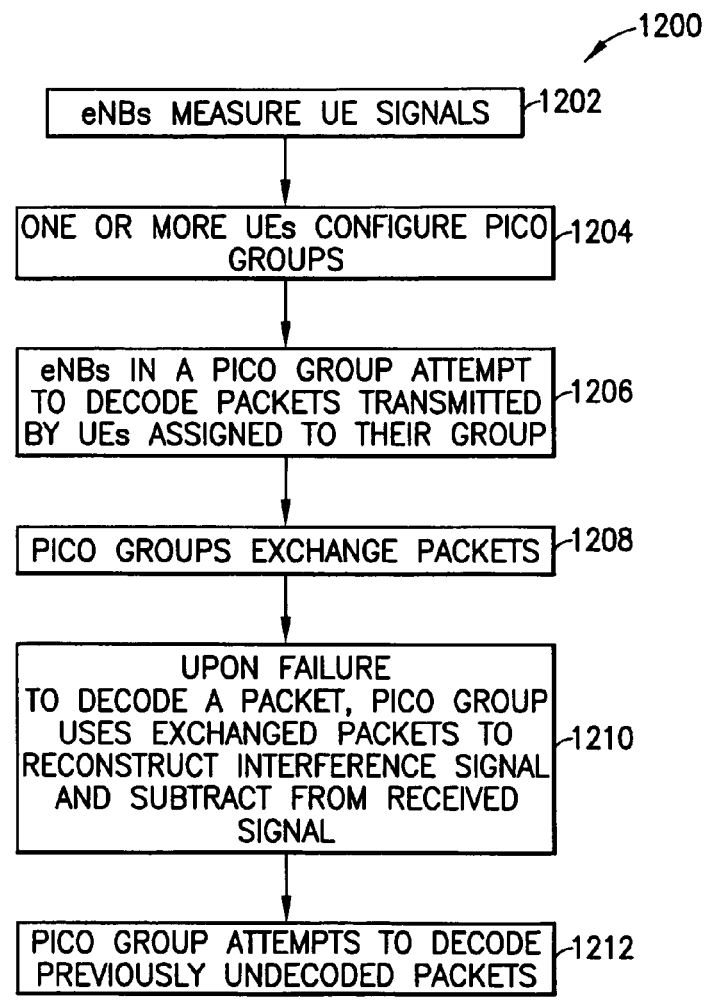
FIG. 12 illustrates a process according to an embodiment of the present invention.

FIG. 12 illustrates a process 1200 according to an embodiment of the present invention. At step 1202, a plurality of pico eNodeBs serving pico cells in a pico cluster measure signals of UEs operating within the pico cluster. At step 1204, one or more UEs configure pico groups comprising pico eNodeBs in the pico cluster. The pico group is configured based on suitable criteria, such as signal to noise ratio, and the criteria may also include criteria related to efficiency of operation, such as reduced requirements for signaling.

At step 1206, as the UEs engage in communication, the pico eNodeBs belonging to a pico group attempt to decode packets transmitted by UEs assigned to the group to which they belong. At step 1208, pico groups exchange packets with other pico groups. At step 1210, upon failure of a pico group to decode packets from a UE, the pico group uses the exchanged packets to reconstruct an interference signal and subtracts the interference signal from the received signal to produce a corrected received signal. At step 1212, the pico group attempts to decode the previously undecoded packets using the corrected received signal.

Figure 13:
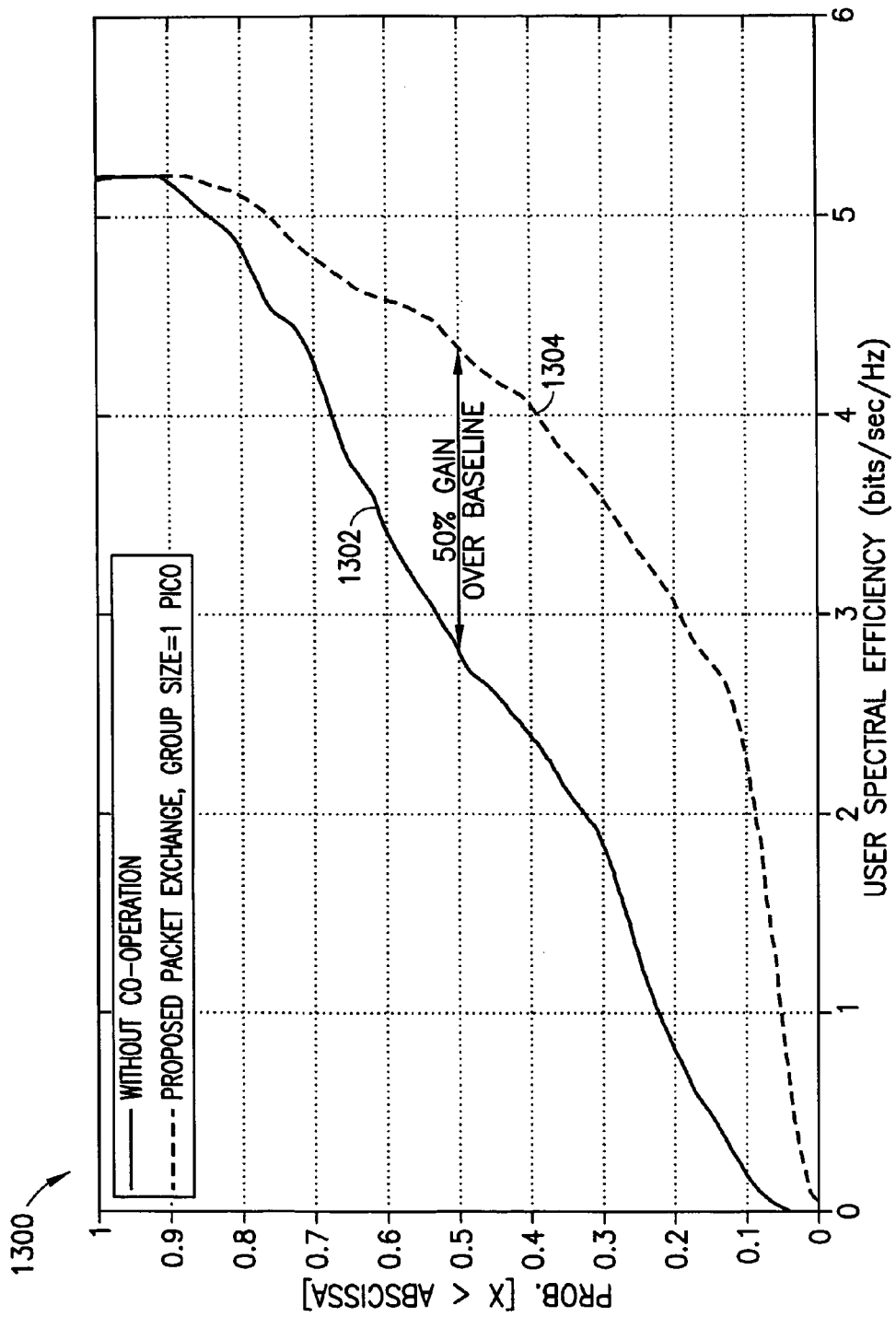
FIGS. 13 and 14 illustrate graphs showing performance improvements yielded by one or more embodiments of the present invention.
Figure 14:
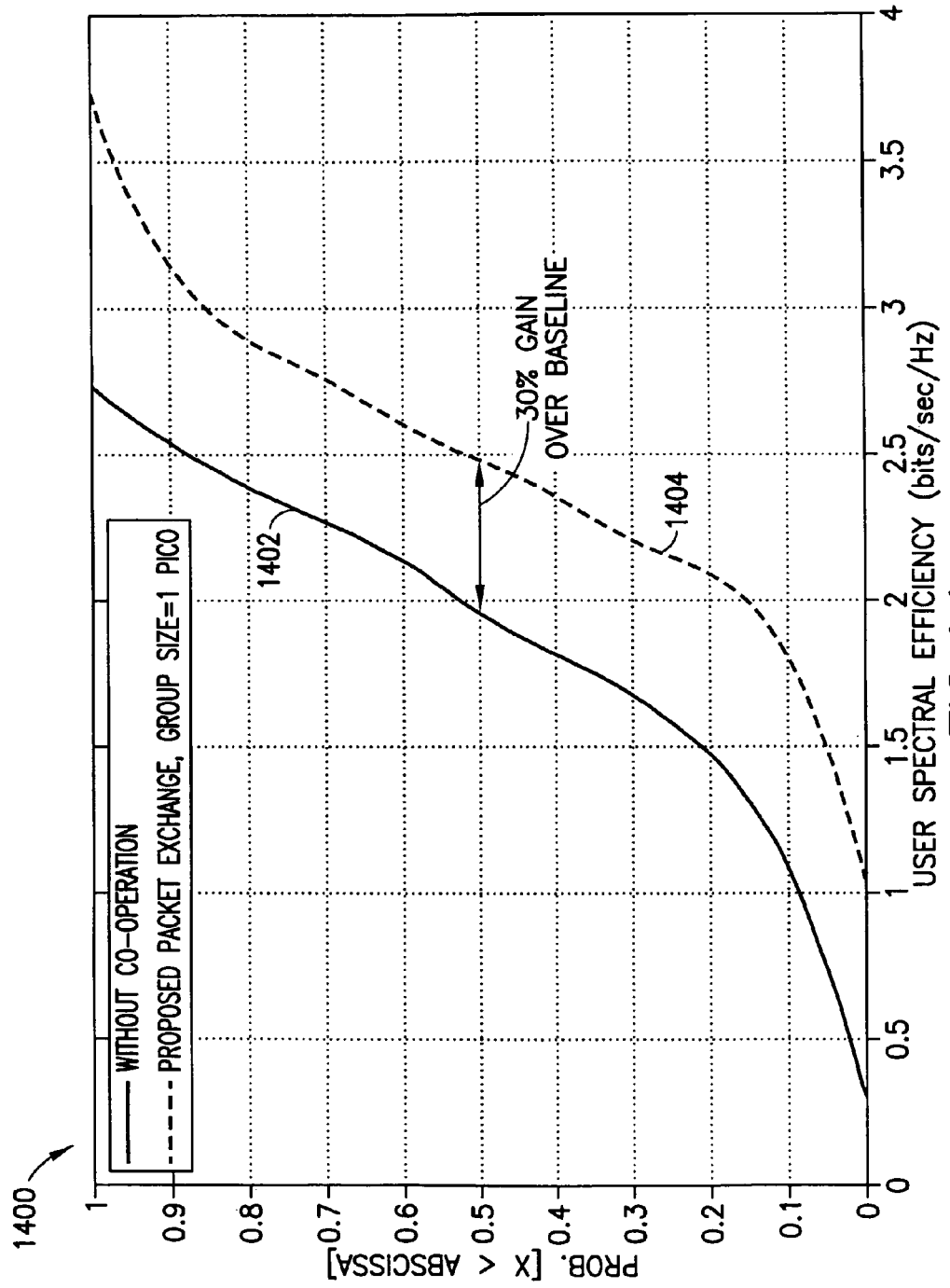

FIGS. 13 and 14 illustrate graphs 1300 and 1400, showing improvements achieved by embodiments of the present invention. The graph 1300 of FIG. 13 shows a situation in which no power control is performed, with a curve 1302 showing user throughput using conventional operations and with a curve 1304 showing user throughput using operations according to one or more embodiments of the present invention. The graph 1400 of FIG. 14 shows a situation in which no power control is performed, with a curve 1402 showing user throughput using conventional operations and with a curve 1404 showing user throughput using operations according to one or more embodiments of the present invention.

Various modifications and adaptations to the foregoing exemplary embodiments of this invention may become apparent to those skilled in the relevant arts in view of the foregoing description. While various exemplary embodiments have been described above it should be appreciated that the practice of the invention is not limited to the exemplary embodiments shown and discussed here.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

We claim:

1. An apparatus comprising:
   memory;
   at least one processor;
   a program of instructions configured to, with the memory and the at least one processor, configure the apparatus to perform actions comprising at least:
   identify members of a group of virtual cells, with the identification of members of the group being based at least in part on radio signal characteristics, wherein the members of the group act in coordination to interpret and decode transmissions from a user device associated with the apparatus;
   directing analysis of a transmission from the user device associated with the apparatus to decode packets transmitted by the user device, wherein analyzing the transmission is performed jointly by at least a serving cell and one additional cell; and
   based on the analysis, delivering decoded baseband packets to at least one other apparatus having at least one other associated user device, wherein delivering the decoded baseband packets is accomplished within a baseband unit or through transfer between multiple baseband units through an aggregator.

2. The apparatus of claim 1, wherein the actions further comprise reconstructing an interference signal using decoded packets received from at least one other apparatus.

3. The apparatus of claim 2, wherein reconstructing the interference signal is performed in response to failure to decode packets from an associated user device.

4. The apparatus of claim 3, wherein the actions further comprise subtracting the interference signal from a received signal from the associated user device and attempting to decode packets using a corrected received signal resulting from the subtraction.

5. The apparatus of claim 1, wherein the apparatus is one of a plurality of apparatuses associated with the user device.

6. An apparatus comprising:
   memory;
   at least one processor; and
   a program of instructions configured to, with the memory and the at least one processor, configure the apparatus to perform actions comprising at least:
   configuring at least one base station to form a first group of base stations, the first group of base stations communicating with the apparatus, wherein the members of the first group of base stations are selected based on radio signal characteristics; and
   transmitting signals for joint decoding by base stations belonging to the group to construct an interference signal representing interference caused by the apparatus, wherein the interference signal comprises interference information for use in interference estimation by at least one base station belonging to a second group of base stations communicating with a second apparatus.

7. The apparatus of claim 6, wherein configuring at least one base station is based at least in part on signal to noise ratio of signals from the apparatus to the at least one base station.

8. The apparatus of claim 6, wherein configuring at least one base station is based at least in part on geographic location of the apparatus with respect to the at least one base station.

9. The apparatus of claim 6, wherein the group of base stations comprises more than one base station and wherein configuring the base stations comprises determining an optimal configuration based on overall signal to noise ratio of signals between the apparatus and each base station.

10. The apparatus of claim 6, wherein configuring the base stations is based at least in part on signalling efficiency.

11. A method comprising:
    identifying members of a group of virtual cells, with the identification of members of the group being based at least in part on radio signal characteristics, wherein the members of the group act in coordination to communicate with a user device associated with an apparatus
    analyzing a transmission from a user device associated with the apparatus to decode packets transmitted by the device, wherein analyzing the transmission is performed jointly by at least a serving cell and one additional cell; and
    based on the analysis, delivering decoded baseband packets to at least one other apparatus having at least one other associated user device, wherein delivering the decoded baseband packets s accomplished within a baseband unit or through transfer between multiple baseband units through an aggregator.

12. The method of claim 11, further comprising reconstructing an interference signal using decoded packets received from at least one other apparatus.

13. The method of claim 12, wherein reconstructing the interference signal is performed in response to failure to decode packets from an associated user device.

14. The method of claim 12, further comprising subtracting the interference signal from a received signal from the associated user device and attempting to decode packets using a corrected received signal resulting from the subtraction.

15. The method of claim 11, wherein the apparatus is one of a plurality of apparatuses associated with the user device.

16. A non-transitory computer readable medium storing a program of instructions, execution of which by a processor configures an apparatus to perform actions comprising at least:
    configuring at least one base station to form a first group of base stations, the first group of base stations communicating with the apparatus, wherein the members of the first group of base stations are selected based on radio signal characteristics; and
    transmitting signals for joint decoding by base stations belonging to the group to construct an interference signal representing interference caused by the apparatus, wherein the interference signal comprises interference information for use in interference estimation by at least one base station belonging to a second group of base stations communicating with a second apparatus.

17. The computer readable medium of claim 16, wherein configuring at least one base station is based at least in part on signal to noise ratio of signals from the apparatus to the at least one base station.

18. The computer readable medium of claim 16, wherein configuring at least one base station is based at least in part on geographic location of the apparatus with respect to the at least one base station.

19. The computer readable medium of claim 16, wherein the group of base stations comprises more than one base station and wherein configuring the base stations comprises determining an optimal configuration based on overall signal to noise ratio of signals between the apparatus and each base station.

20. The computer readable medium of claim 16, wherein configuring the base stations is based at least in part on signalling efficiency.

* * * * *